(12) United States Patent
Seitz

(10) Patent No.: US 8,215,349 B2
(45) Date of Patent: Jul. 10, 2012

(54) TIRE WITH INNER SURFACE PROVIDED WITH A NANOSTRUCTURE

(75) Inventor: Norbert Seitz, Gröbenzell (DE)

(73) Assignee: Lars Bertil Carnehammer, Johanneshov (SE)

( * ) Notice: Subject to any disclaimer, the term of this patent is extended or adjusted under 35 U.S.C. 154(b) by 623 days.

(21) Appl. No.: 12/374,007

(22) PCT Filed: Jul. 18, 2007

(86) PCT No.: PCT/EP2007/057416
§ 371 (c)(1),
(2), (4) Date: Mar. 8, 2009

(87) PCT Pub. No.: WO2008/009696
PCT Pub. Date: Jan. 24, 2008

(65) Prior Publication Data
US 2010/0006195 A1    Jan. 14, 2010

(30) Foreign Application Priority Data

Jul. 21, 2006 (DK) ................................. 2006 01006
Nov. 22, 2006 (DK) ................................. 2006 01529

(51) Int. Cl.
*F16F 15/32* (2006.01)
(52) U.S. Cl. ............ 152/154.1; 152/501; 152/504; 152/510; 152/513; 152/525
(58) Field of Classification Search .......... 152/151, 152/154.1, 209.15, 209.18, 450, 458, 525, 152/526, 564, 501, 504, 510, 513
See application file for complete search history.

(56) References Cited

U.S. PATENT DOCUMENTS

| 4,139,395 | A |   | 2/1979  | Dunlap |
|-----------|---|---|---------|--------|
| 4,336,293 | A | * | 6/1982  | Eiden ............................ 428/143 |
| 4,867,792 | A | * | 9/1989  | Ronlan ........................ 106/162.5 |
| 5,147,477 | A | * | 9/1992  | Mouri et al. ................ 152/209.4 |
| 5,351,734 | A | * | 10/1994 | Mouri et al. ................ 152/209.4 |
| 5,358,772 | A | * | 10/1994 | Nakagawa et al. ........... 428/148 |
| 5,431,726 | A | * | 7/1995  | Ronlan ........................... 106/266 |
| 6,099,818 | A | * | 8/2000  | Freund et al. ................ 423/449.1 |
| 6,533,012 | B1 | * | 3/2003 | Jardine et al. .................. 152/527 |
| 6,575,215 | B1 | * | 6/2003 | Hino et al. .................. 152/209.4 |
| 7,225,844 | B2 | * | 6/2007 | Lagnier .................... 152/209.21 |

FOREIGN PATENT DOCUMENTS

| DE | 19857646 A1 | * | 6/2000 |
| DE | 19853691 A1 | * | 7/2000 |
| EP | 0 281 252 B1 |   | 6/1994 |
| EP | 0 557 365 B1 |   | 9/1996 |

OTHER PUBLICATIONS

Hiroyuki Sugimura et al., "Fabrication of Silicon Nanostructures Through Scanning Probe Anodization Followed by Chemical Etching", Nanotechnology 6, 1995, 29-33.

* cited by examiner

*Primary Examiner* — Joseph Del Sole
*Assistant Examiner* — Seyed Masoud Malekzadeh
(74) *Attorney, Agent, or Firm* — Stephen A. Bent; Foley & Lardner LLP

(57) ABSTRACT

The invention relates to automobile tires or tire assemblies or parts thereof suitable for being balanced by introduction therein of a thixrotropic balancing gel, wherein surfaces of the tire or tire assembly or part thereof which are intended to be in contact with the balancing gel are provided with a surface nanostructure with an average surface roughness in the range of 1-1000 nm. The surface nanostructure will enable the thixotropic balancing gel to move to the location, where it balances the tire, significantly quicker than if the surface in question did not have the surface nanostructure.

19 Claims, No Drawings

TIRE WITH INNER SURFACE PROVIDED WITH A NANOSTRUCTURE

FIELD OF THE INVENTION

The present invention concerns automobile tires, tire assemblies or parts of tire assemblies suitable for being balanced by means of balancing gels, in particular thixotropic balancing gels.

BACKGROUND OF THE INVENTION

It is well known to balance wheel assemblies comprising tires and wheel rims in a dynamic fashion using thixotropic balancing gels instead of the classic, static metal weights fitted to the edges of the wheel rim, see e.g. EP 0 557 365 describing such a gel. The thixotropic balancing gel is designed to be able to change from a gel into a viscous fluid when subjected to the shear forces resulting from the vibrations produced in an unbalanced wheel assembly on a moving vehicle, and upon the change in rheological properties the resulting viscous liquid or fluid in the tire will move to a position where it counteracts the imbalance, thereby stopping the vibrations. Once the vibrations have stopped, the balancing material will re-assume its gel state and remain in place, even when the vehicle stops. Also, imbalances occurring later on e.g. as a result of uneven tyre wear will constantly be balanced out.

In such applications, a suitable amount of the balancing gel is applied in the air chamber of the tire, namely on the inside of the outer tire wall on the surface of the tire liner as provided during manufacture of the tire. When the gel becomes a viscous liquid as a result of being exposed to the shear forces from the imbalance, the liquid will therefore have to flow across the entire surface of the tire liner and hence have to overcome whatever surface forces are present between the gel and the tire liner resulting from the surface tension between them, the surface tension typically being quantified by the contact angle between the gel/liquid and the tire liner. Clearly, such a flow process will require a certain amount of time, particularly when the surface tension conditions cause a certain degree of adhesion between the gel and the liner, and it would clearly be advantageous if the time requirement could be reduced since it would mean a quicker balancing process. However, there have been no attempts at improving the ability of a thixotropic balancing gel to flow across the surface and hence potentially reduce the time necessary to attain balance of the wheel assembly.

SUMMARY OF THE INVENTION

The object of the present invention is to reduce the time for a balancing gel in a wheel assembly to flow across the surface of the material in which it is in contact, typically the inside of the tire or part thereof, especially the tire liner whose purpose is I.a. to ensure air tightness of the tire, and hence to reduce the balancing time.

In one aspect of the invention, this and other objects are attained by providing said surface with a nanostructure. Thus, the invention relates to an automobile tire or tire assembly or part thereof suitable for being balanced by introduction therein of a thixotropic balancing gel, wherein surfaces of the tire or tire assembly or part thereof which are intended to be in contact with the balancing gel are provided with a surface nanostructure with an average surface roughness in the range of 1-1000 nm.

The presence of such a structure on the surface in contact with the balancing gel will result in a substantial increase in the contact angle between the gel and said surface which in turn will cause the gel to wet the surface less, bringing about a reduction in contact area between the gel and the surface and thereby making it easier for the gel to move across the surface in response to the forces exerted on it by the vibrations caused by imbalance.

DETAILED DESCRIPTION OF THE INVENTION

In the present context, the term "nanostructure" is to be understood as referring to any surface structure which has surface details of a size in the nanometre range and which reduces the actual contact area between the gel/liquid and the surface with which it is in contact.

The function of the nanostructure is to enable the gel to, so to speak, be "balanced" or "perched" on the tops of the surface features of the structure and thereby achieve a significant increase in the contact angle of the gel vis-á-vis the material on which the nanostructure is provided. Thus, a normal contact angle of, for example, 120° for normal wetting with a gel could typically be increased to up to 170° which will enable a drop of the gel to practically roll along the structured surface at a significantly higher speed than would be possible without the nanostructure on the surface.

With respect to the spatial nature of the nanostructure, such a surface structure may typically exhibit numerous apices of the size indicated above and in the following. The apices may in principle be of any form or shape possible, and examples of such forms or shapes are individual, separate peaks or protrusions, i.e. usually of a partially spherical, hemispherical, or generally conical shape, and distributed in a random or regularly patterned fashion across the surface; or generally parallel ridges, where the ridgelines may be straight or form curves (such as generally sinusoidal curves), and where the ridgelines may run both generally parallel to, generally perpendicular to or at an angle with the peripheral direction of the tire. However, the apices may also be part of an irregular nanostructure.

Presently preferred types of nanostructures are of the ridged and the peak type.

In preferred embodiments, the surface roughness is in the range of 5-800 nm, preferably 10-700 nm, more preferably 30-600 nm, especially 40-500 nm, in particular 50-400 nm, more particularly 60-300 nm, most particularly 60-200 nm, such as 80-150 nm, for example about 100 nm.

In one embodiment, the nanostructure is provided on the radially outer wall of the tire air chamber, typically on the tire liner.

In a further embodiment, in order to reduce the geometrical area of the surface in contact with the gel and hence reduce the amount of gel needed in the tire, the surface of the tire liner may be subdivided into two or more circumferential sections, for example in the manner described in DE 198 53 691 Ai. In a typical example of such an arrangement, the surface of the tire liner is provided with two circumferential ridges, thus dividing the tire liner surface into three sections, namely a central one and two outer ones, and in such a case the balancing gel will typically be applied onto the two outer sections since that will enable both static and dynamic balancing, and the nanosurface structure of the invention will then preferably be present on the surface of these outer sections.

In a yet a further embodiment of the invention, the nanosurface structure is provided on the inner surface of at least one gel receptacle physically separate from the tire and capable of being releasably attached inside the tire, typically to the inside of the radially outer wall of the tire. The receptacle may have any appropriate shape, but in one possible embodiment, the receptacle is in the form of an annular, radially inward open trough designed to be releasably mounted inside the tire.

Thus, as a non-limiting example such a trough may for example have a square U-shaped cross section where the inner surface of the bottom of the "U" and, if necessary, part of the inside of the radial walls is provided with the nanostructure of the invention. Further, the outer surface of the bottom of the "U" may for example be provided with an adhesive coating (optionally a detachable adhesive) enabling the trough containing the balancing gel to be mounted inside the tire against the radially outer wall before the tire is fitted onto the wheel rim. However, the skilled person will be able to suggest numerous alternatives concerning the exact shape of the receptacle and the manner in which is it attached to the tire, including for example an arrangement where an annular trough is snapped onto the wheel rim outside the tire, and all such solutions are comprised by the present invention.

If the receptacle containing the balancing gel is in the form of the above described annular, radially inward open trough, it may preferably also be provided with an optionally detachable cover such as a film cover, and the skilled person will be able to suggest such by virtue of his knowledge.

The surface features of the nanostructure, for example the apices of a ridge or peak structure, typically have a mean distance from one another in the range of 1-1000 nm, preferably 5-800 nm, more preferably 10-700 nm, still more preferably 30-600 nm, especially 40-500 nm, in particular 50-400 nm, more particularly 60-300 nm, most particularly 60-200 nm, such as 80-150 nm, for example about 100 nm. In a typical and preferred embodiment, the mean distance between the apices of the nanostructure is of the same order of magnitude as the surface roughness, preferably approximately the same as the surface roughness.

The nanostructure may be provided on to the surface in question in a variety of ways which will be well known to a person skilled in the art of nanostructure technology.

Thus, in one embodiment the nanostructure could be provided by applying onto the surface of the liner of the finished tire anyone of the known composite "nanovarnishes" incorporating for example modified nanoscale silica particles in an acrylate matrix. Reference is made to for example the nanovarnishes developed by Daimler-Chrysler AG for exterior use on automobiles (see e.g. "Der Spiegel", 25 Dec. 2003) as well as the nanovarnishes marketed by the company Nanoproofed® GbR, (Gothendorf, Germany) or the company Nanogate AG (Saarbrücken, Germany).

In another embodiment of the invention, it is contemplated that when the nanostructure is to be provided for example on the liner of a tire, an inverse version or image of the nanostructure is first provided on the outer surface of the annular rubber bladder used in tire production to inflate the raw, unvulcanised tyre preform in the vulcanisation mould. Thus, when the tire preform is placed inside the heated vulcanisation mould, and the bladder is inflated to press the outside of the preform against the inner surface of the mould carrying the tread pattern (in reverse) in order to heat and vulcanise the preform as well as impart the tread pattern onto what will become the tread of the tire, the bladder will simultaneously impart the nanostructure onto the unvulcanised tire liner, whereupon the vulcanisation process (provided through circulating a hot liquid in the walls of the mould) will fix the nanostructure onto the inner surface of the tire liner in the finished tire. Naturally, the same process can be used to provide a nanostructure on the surface of the annular receptacle described above.

It is also contemplated that the nanostructure on the tire inflation bladder will have a further function during the vulcanisation process, namely by assisting in allowing air initially present between the bladder and the future tire liner on the inside of the preform to flow away more easily and effectively during bladder inflation and hence significantly eliminate the occurrence of trapped pockets of air between the bladder and the tire liner and thereby significantly eliminate voids or dimples on the liner of the finished tire.

The inverted pattern on the surface of the inflation bladder may be provided in a similar way, e.g. from a corresponding (positive) nanostructure on a metal surface, which in turn has been prepared by known means such as laser etching, reactive ion beam etching (see e.g. M. Endo, et al., Jpn. J. Appl. Phys., Vol 41 (2002) pp 2689-2693), photoetching, chemical etching, anodization using a scanning probe followed by chemical etching (see. e.g. H. Sugimura et al., Nanotechnology, Vol. 6 (1995), pp 29-33), or by the application of the above described nanovarnishes.

In a further aspect of the invention, the part or parts of the surface of the tire liner which are intended to be in contact with the balancing gel and hence provided with the nanostructure of the invention may be limited to one or more areas of the tire liner surface. Preferably, such areas are constituted by strip-like sections of the surface of the radially outer wall of the tire liner, said strip-like sections extending in the direction of the circumference of the tire.

One advantage of arranging the balancing gel in this manner is that the gel can be concentrated in areas where it can be more effective at balancing the final wheel assembly instead of, for example, being spread across the entire surface of the radially outer wall of the tire liner.

In one typical configuration embodiment, the part or parts of the surface of the tire liner which are intended to be in contact with the balancing gel and hence provided with the nanostructure are constituted by two circumferentially extending strips located in the area of the tire liner surface in the shoulder areas of the tire, i.e. the area of the tire around the outer edges of the tire's tread. The width of the strip can conveniently be expressed as fractions of the width of the reinforcing belt located nearest to the tire liner, said belt width being designated $W_{belt}$ in the following. The width of the belt, i.e. $W_{belt}$, may conveniently be expressed in terms of the width of the tread (in the following designated $W_{tread}$) so that $W_{belt}$ typically equals 0.9-0.95 time $W_{tread}$.

Typical widths of the strip-like areas in the tire shoulder regions may be 10-20% of $W_{belt}$ each. The strips are typically located so that their outer edges are located at the shoulder point of the tire which is the edge of the tread.

In another configuration embodiment, two shoulder strips as described above are supplemented by a central circumferential strip, i.e. typically extending in an area centered around what corresponds to the centreline of the tread. If such a central strip is present, its width may typically be 10-40% of $W_{belt}$, such as 20-30% of $W_{belt}$.

In order to ensure that the balancing gel remains inside the areas intended for it as described above, the areas outside the surface parts provided with the nanostructure of the invention, i.e. what could be termed "non-gel areas", may be provided with means for preventing the balancing gel spreading onto them. Such means may take various forms.

In one embodiment, the "non-gel areas" may be provided with a surface structure. The surface structure may in one version be a microstructure, where the average surface roughness of the microstructure may typically be in the range of 0.1-0.001 mm, such as 0.05-0.005 mm, for example around 0.02 mm. In another version, the surface structure may be a macrostructure, where the average surface roughness of the macrostructure may typically be in the range of 1-0.1 mm, such as 0.8-0.3 mm, for example around 0.5 mm.

The micro- or macrostructure may in some cases be the surface structure which the tire liner is provided with under normal productions procedures as practiced in the tire industry. Naturally, in such cases the tire in question only needs to be provided with the appropriate nanostructure in the areas intended to be in contact with the balancing gel. However, in other cases the micro- or macrostructure may be made for this particular purpose, typically using a corresponding version of the method described above for imparting a nanostructure onto the tire liner, i.e. where an inverse version of the micro- or macrostructure is first provided on the outer surface of the annular rubber bladder used to inflate the raw, unvulcanised tire perform in the vulcanisation mould.

In another embodiment, the means for preventing the balancing gel spreading onto the "non-gel areas" may comprise a layer of a sealing material intended to seal tire punctures. Such a sealing material should of course be of a type that will remain in place within the tire cavity when the vehicle is stationary. Likewise, the material should as well be of a type that does not move even when the wheel assembly is unbalanced, i.e. that the material is not thixotropic like the balancing gel itself. Such gels may typically comprise semi-fluid or paste-like polybutene compounds, optionally containing fibres for assisting in plugging any leaks.

In yet a further embodiment, the means for preventing the balancing gel spreading onto the "non-gel areas" may comprise a layer of a lubricant material, for example of the type used in wheel assemblies that are capable of running on a flat tire, such as the PAX system from Michelin, France, where the purpose of the lubricant is to reduce friction between an inner sub-diameter wheel and the tire liner.

The invention is further illustrated in the following, non-limiting examples.

EXAMPLE 1

An experiment was conducted to evaluate the behaviour of a balancing gel on an inner liner surface provided with a nanostructure through application of a flexible nanovarnish.

A standard Michelin Energy tire of size 175/70 R13 82T was used. The surface of the inner liner was divided circumferentially into two equally sized parts, one a test area to be treated with the nanovarnish and the other to be left untreated for comparison purposes.

The test area was treated with a heat-curable, two-component nanovarnish obtained from Nanogate AG (Saarbrücken, Germany) and consisting of a two-component polyurethane base material containing nanoparticles of a size between 10 and 100 nm. The polyurethane-based material was mixed in a ratio of 100 parts resin containing the nanoparticles and 3 parts hardener and applied by means of a paint brush. Following application, the nanovarnish layer was cured at 120° C. for 30 minutes to give a flexible layer having a surface nanostructure.

The balancing gel used was a thixotropic tire balancing gel available from Autobalance Plc. Stockholm, Sweden, and based on UCON 50-HB-5100 ethylene glycol/propylene glycol copolymer from Dow Chemicals and fumed silica from Degussa, Germany.

Two portions of 20 g each of balancing gel were placed on the treated and untreated surfaces, respectively, with one portion on each and each assembled in single spots. The tire was then mounted on a wheel rim and subsequently placed on a test stand where it was rotated under conditions simulating road conditions at 160 km/h and with loads simulating an imbalance. The positions of the respective portions of balancing gel were determined periodically.

It was found that after only 2.7 minutes, the portion of balancing gel located on the test area provided with nanovarnish had moved completely around the entire inside circumference of the tire, i.e. a distance of approximately 200 cm. By comparison, after 21 minutes of rotation the portion of balancing gel located on the untreated tire liner surface had only moved about 20 cm.

It was concluded that the presence of a surface nanostructure on the inner liner of a tire significantly increases the ability of a thixotropic balancing gel to move across the surface of a tire liner.

EXAMPLE 2

The experiment in Example 1 was repeated using a room temperature-curing, two-component nanovarnish obtained from Nanogate AG containing nanoparticles of a size between 10 and 100 nm. The nanovarnish comprised a first clear liquid component A (designated ZIH 0308-001 and containing i.a. methanol and ethanol) and a second clear liquid component B (designated ZIH 0308-002 and containing i.a. methanol, ethanol and 3-(trimethoxysilyl)-propylamine). Component A and component B were mixed in a ratio of 1:1 and applied in the same manner as in Example 1 and cured at room temperature for 24 hours to give a flexible layer having a surface nanostructure.

When tested using the same balancing gel as in Example 1 and in the same manner, the balancing gel moved for a distance similar to that of Example 1 on the nanostructured surface.

The invention is defined in the appended claims.

The invention claimed is:

1. Automobile tire or tire assembly or a part thereof, to be balanced by introduction therein of a thixotropic balancing gel, wherein surfaces of the tire or tire assembly or part thereof that contact the balancing gel are provided with a surface nanostructure that has an average surface roughness in the range of 1-1000 nm and that being configured to reduce the actual contact area between the balancing gel and said surfaces such that the balancing gel wets said surfaces less, thereby easing gel movement across said surfaces in response to forces exerted by imbalance of the tire or tire assembly or part thereof.

2. Automobile tire or tire assembly or part thereof according to claim 1 wherein the nanostructure is provided at least on the surface of the radially outer wall of the tire liner.

3. Automobile tire or tire assembly or part thereof according to claim 1 wherein the radially outer wall of the tire is subdivided into two or more circumferential sections.

4. Automobile tire or tire assembly or part thereof according to claim 1 wherein the nanostructure is provided on the radially outer wall of an annular, radially inward open trough designed to be releasably mounted inside the tire.

5. Automobile tire or tire assembly or part thereof according to claim 4 wherein said trough can be closed by means of an optionally detachable film cover.

6. Automobile tire or tire assembly or part thereof according to claim 4 wherein the annular trough is capable of being detachably mounted inside the air chamber of the tire.

7. Automobile tire or tire assembly or part thereof according to claim 1 wherein the nanostructure is of the peak or ridged type.

8. Automobile tire or tire assembly or part thereof according to claim 1 wherein the mean distance between the apices of the nanostructure is in the range of 1-1000 nm.

9. Automobile tire or tire assembly or part thereof according to claim 1 wherein the mean distance between the apices of the nanostructure is of the same order of magnitude as the surface roughness, preferably approximately the same as the surface roughness.

10. Automobile tire or tire assembly or part thereof according to claim 3 where the radially outer wall of the tire is subdivided into two or more circumferential sections by means of circumferential ridges on the tire liner.

11. Automobile tire or tire assembly or part thereof according to claim 1 wherein the surfaces of the tire or tire assembly or part thereof which are provided with the nanostructure are constituted by strip-like sections of the surface of the radially outer wall of the tire liner, said strip-like sections extending in the direction of the circumference of the tire.

12. Automobile tire or tire assembly or part thereof according to claim 11 wherein the nanostructured sections of the surface of the tire liner are constituted by two circumferentially extending strips located in the area of the tire liner surface in the shoulder areas of the tire, each strip preferable having a width of 10-20% of the width of the tread reinforcing belt located closest to the tire liner.

13. Automobile tire or tire assembly or part thereof according to claim 11 wherein the nanostructured sections of the surface of the tire liner are constituted by two circumferentially extending strips located in the area of the tire liner surface in the shoulder areas of the tire as well as a central circumferential strip, the width of said strip preferably being 10-40% of the width of the tread reinforcing belt located closest to the tire liner, especially 20-30% of the width of the tread reinforcing belt located closest to the tire liner.

14. Automobile tire or tire assembly or part thereof according to claim 1 wherein the surfaces of the tire or tire assembly or part thereof which are not provided with the nanostructure are provided with means for preventing the balancing gel spreading onto them.

15. Automobile tire or tire assembly or part thereof according to claim 14 wherein means for preventing spread of the balancing gel are constituted by a microstructure in the surface of the tire liner, said microstructure having a surface roughness in the range of 0.001-0.1 mm; a macrostructure in the surface of the tire liner, said macrostructure having a surface roughness in the range of 0.1-1 mm; a layer of a tire sealing compound deposited on the tire liner surface; or a layer of a lubricant deposited on the tire liner surface.

16. Automobile tire or tire assembly or part thereof according to claim 1 wherein the surface roughness is in the range of 5-800 nm.

17. Automobile tire or tire assembly or part thereof according to claim 1 wherein the surface roughness is about 100 nm.

18. Automobile tire or tire assembly or part thereof according to claim 1 wherein the mean distance between the apices of the nanostructure is in the range of 5-800 nm.

19. Automobile tire or tire assembly or part thereof according to claim 1 wherein the mean distance between the apices of the nanostructure is about 100 nm.

* * * * *